United States Patent
Ostrye et al.

(10) Patent No.: US 10,838,440 B2
(45) Date of Patent: Nov. 17, 2020

(54) MULTISTAGE HVAC SYSTEM WITH DISCRETE DEVICE SELECTION PRIORITIZATION

(71) Applicant: Johnson Controls Technology Company, Milwaukee, WI (US)

(72) Inventors: Nathan T. Ostrye, Milwaukee, WI (US); Tyler K. Paddock, Greenfield, WI (US); Aron M. Seiler, White Hall, MD (US); Christopher R. Amundson, Grafton, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 191 days.

(21) Appl. No.: 15/824,618

(22) Filed: Nov. 28, 2017

(65) Prior Publication Data

US 2019/0163213 A1 May 30, 2019

(51) Int. Cl.
*G05D 23/19* (2006.01)
*F24F 11/61* (2018.01)
(Continued)

(52) U.S. Cl.
CPC .......... *G05D 23/1904* (2013.01); *F24F 11/46* (2018.01); *F24F 11/61* (2018.01);
(Continued)

(58) Field of Classification Search
CPC .......... G05D 23/1904; G05D 23/1951; G05D 23/1931; G05D 23/1932; F24F 11/49;
(Continued)

(56) References Cited

U.S. PATENT DOCUMENTS 4,349,869 A 9/1982 Prett et al.
4,616,308 A 10/1986 Morshedi et al.
(Continued)

FOREIGN PATENT DOCUMENTS

WO   WO 2011/080548      7/2011
WO   WO-2017/062896 A1   4/2017
WO   WO-2017/062898 A1   4/2017

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
(Continued)

*Primary Examiner* — Nelson J Nieves
(74) *Attorney, Agent, or Firm* — Foley & Lardner LLP

(57) ABSTRACT

A controller for a plurality of devices of a building control system that operate in parallel to provide a desired capacity of heating or cooling for a building space includes a capacity identifier configured to identify the desired capacity of heating or cooling for the building space. The controller further includes a combination finder configured to generate a list of combinations of devices that can be energized to provide the desired capacity. The controller further includes a combination filter configured to remove any combinations from the list that do not meet one or more requirements. The controller further includes a combination selector configured to select one of the combinations based on at least one of a runtime and a transition count. The controller further includes a signal generator configured to generate control signals in accordance with the selected combination and operate the plurality of devices using the control signals.

20 Claims, 8 Drawing Sheets

(51) Int. Cl.
*F24F 11/65* (2018.01)
*F24F 11/70* (2018.01)
*F24F 11/46* (2018.01)
*G05B 15/02* (2006.01)

(52) U.S. Cl.
CPC .............. *F24F 11/65* (2018.01); *F24F 11/70* (2018.01); *G05D 23/1919* (2013.01); *G05B 15/02* (2013.01); *G05B 2219/2614* (2013.01)

(58) Field of Classification Search
CPC .. F24F 11/62; F24F 11/65; F24F 11/86; F24F 11/30; F24F 2140/50; F24F 2140/60; F24F 2221/50
See application file for complete search history.

(56) References Cited

U.S. PATENT DOCUMENTS

| | | |
|---|---|---|
| 5,083,438 A | 1/1992 | McMullin |
| 5,193,742 A | 3/1993 | Byun |
| 5,301,101 A | 4/1994 | MacArthur et al. |
| 5,347,446 A | 9/1994 | Iino et al. |
| 5,351,184 A | 9/1994 | Lu et al. |
| 5,408,406 A | 4/1995 | Mathur et al. |
| 5,442,544 A | 8/1995 | Jelinek |
| 5,519,605 A | 5/1996 | Cawlfield |
| 5,540,555 A | 7/1996 | Corso et al. |
| 5,572,420 A | 11/1996 | Lu |
| 5,573,181 A | 11/1996 | Ahmed |
| 5,579,993 A | 12/1996 | Ahmed et al. |
| 5,600,960 A | 2/1997 | Schwedler et al. |
| 5,669,225 A | 9/1997 | Beaverson et al. |
| 5,809,795 A | 9/1998 | Beaverson et al. |
| 5,902,183 A | 5/1999 | D'Souza |
| 6,055,483 A | 4/2000 | Lu |
| 6,085,532 A | 7/2000 | Sibik |
| 6,095,426 A | 8/2000 | Ahmed et al. |
| 6,122,555 A | 9/2000 | Lu |
| RE37,245 E | 6/2001 | Scholten et al. |
| 6,257,007 B1 | 7/2001 | Hartman |
| 6,276,152 B1 | 8/2001 | Sibik |
| 6,278,899 B1 | 8/2001 | Piche et al. |
| 6,347,254 B1 | 2/2002 | Lu |
| 6,459,939 B1 | 10/2002 | Hugo |
| 6,505,475 B1 | 1/2003 | Zugibe et al. |
| 6,532,754 B2 | 3/2003 | Haley et al. |
| 6,688,384 B2 | 2/2004 | Eoga |
| 6,694,759 B1 | 2/2004 | Bash et al. |
| 6,698,219 B2 | 3/2004 | Sekhar et al. |
| 6,718,779 B1 | 4/2004 | Henry |
| 6,719,625 B2 | 4/2004 | Federspiel |
| 6,726,111 B2 | 4/2004 | Weimer et al. |
| 6,732,540 B2 | 5/2004 | Sugihara et al. |
| 6,807,510 B1 | 10/2004 | Backstrom et al. |
| 6,848,623 B2 | 2/2005 | Weimer et al. |
| 6,879,881 B1 | 4/2005 | Attridge |
| 6,964,174 B2 | 11/2005 | Shah |
| 6,973,410 B2 | 12/2005 | Seigel |
| 7,017,827 B2 | 3/2006 | Shah et al. |
| 7,050,863 B2 | 5/2006 | Mehta et al. |
| 7,050,866 B2 | 5/2006 | Martin et al. |
| 7,059,143 B1 | 6/2006 | Zugibe et al. |
| 7,086,240 B1 | 8/2006 | Zugibe et al. |
| 7,113,890 B2 | 9/2006 | Frerichs et al. |
| 7,114,343 B2 | 10/2006 | Kates |
| 7,152,023 B2 | 12/2006 | Das |
| 7,165,399 B2 | 1/2007 | Stewart |
| 7,181,920 B2 | 2/2007 | Capellari et al. |
| 7,188,779 B2 | 3/2007 | Alles |
| 7,197,485 B2 | 3/2007 | Fuller |
| 7,203,554 B2 | 4/2007 | Fuller |
| 7,207,183 B2 | 4/2007 | Crane et al. |
| 7,231,773 B2 | 6/2007 | Crane et al. |
| 7,261,241 B2 | 8/2007 | Eoga |
| 7,266,416 B2 | 9/2007 | Gallestey et al. |
| 7,272,454 B2 | 9/2007 | Wojsznis et al. |
| 7,275,374 B2 | 10/2007 | Stewart et al. |
| 7,275,377 B2 | 10/2007 | Kates |
| 7,293,718 B2 | 11/2007 | Sigafus et al. |
| 7,328,074 B2 | 2/2008 | Das et al. |
| 7,328,577 B2 | 2/2008 | Stewart et al. |
| 7,328,587 B2 | 2/2008 | Shaffer et al. |
| 7,341,201 B2 | 3/2008 | Stanimirovic |
| 7,347,774 B2 | 3/2008 | Aronstam et al. |
| 7,349,824 B2 | 3/2008 | Seigel |
| 7,376,471 B2 | 5/2008 | Das et al. |
| 7,376,472 B2 | 5/2008 | Wojsznis et al. |
| 7,389,773 B2 | 6/2008 | Stewart et al. |
| 7,400,933 B2 | 7/2008 | Rawlings et al. |
| 7,418,372 B2 | 8/2008 | Nishira et al. |
| 7,421,854 B2 | 9/2008 | Shaffer et al. |
| 7,454,253 B2 | 11/2008 | Fan |
| 7,469,546 B2 | 12/2008 | Kates |
| 7,496,413 B2 | 2/2009 | Fan et al. |
| 7,533,536 B1 | 5/2009 | Zugibe et al. |
| 7,551,983 B2 | 6/2009 | Attridge |
| 7,567,888 B2 | 7/2009 | Chang et al. |
| 7,577,483 B2 | 8/2009 | Fan et al. |
| 7,591,135 B2 | 9/2009 | Stewart |
| 7,599,759 B2 | 10/2009 | Zugibe et al. |
| 7,610,108 B2 | 10/2009 | Boe et al. |
| 7,650,195 B2 | 1/2010 | Fan et al. |
| 7,650,206 B2 | 1/2010 | Hudson |
| 7,653,459 B2 | 1/2010 | Pouchak et al. |
| 7,661,274 B2 | 2/2010 | Crane et al. |
| 7,664,573 B2 | 2/2010 | Ahmed |
| 7,669,433 B2 | 3/2010 | Yoon et al. |
| 7,676,283 B2 | 3/2010 | Liepold et al. |
| 7,726,582 B2 | 6/2010 | Federspiel |
| 7,758,407 B2 | 7/2010 | Ahmed |
| 7,766,246 B2 | 8/2010 | Mulhouse et al. |
| 7,770,806 B2 | 8/2010 | Herzon et al. |
| 7,793,509 B2 | 9/2010 | Crane |
| 7,805,952 B1 | 10/2010 | Zugibe et al. |
| 7,819,331 B2 | 10/2010 | Arneson |
| 7,826,909 B2 | 11/2010 | Attarwala |
| 7,827,813 B2 | 11/2010 | Seem |
| 7,844,352 B2 | 11/2010 | Vouzis et al. |
| 7,854,135 B2 | 12/2010 | Stanimirovic |
| 7,856,281 B2 | 12/2010 | Thiele et al. |
| 7,878,178 B2 | 2/2011 | Stewart et al. |
| 7,890,215 B2 | 2/2011 | Duncan |
| 7,891,573 B2 | 2/2011 | Finkam et al. |
| 7,894,943 B2 | 2/2011 | Sloup et al. |
| 7,918,407 B2 | 4/2011 | Patch |
| 7,930,045 B2 | 4/2011 | Cheng |
| 7,945,352 B2 | 5/2011 | Koc |
| 7,945,423 B2 | 5/2011 | Seigel |
| 7,949,416 B2 | 5/2011 | Fuller |
| 7,967,218 B2 | 6/2011 | Alles |
| 7,987,145 B2 | 7/2011 | Baramov |
| 7,991,592 B2 | 8/2011 | Vangilder et al. |
| 7,996,140 B2 | 8/2011 | Stewart et al. |
| 8,005,575 B2 | 8/2011 | Kirchhof |
| 8,019,478 B2 | 9/2011 | Whitehurst et al. |
| 8,032,235 B2 | 10/2011 | Sayyar-Rodsari |
| 8,036,758 B2 | 10/2011 | Lu et al. |
| 8,046,089 B2 | 10/2011 | Renfro et al. |
| 8,046,107 B2 | 10/2011 | Zugibe et al. |
| 8,060,258 B2 | 11/2011 | Butoyi |
| 8,060,290 B2 | 11/2011 | Stewart et al. |
| 8,073,659 B2 | 12/2011 | Gugaliya et al. |
| 8,078,291 B2 | 12/2011 | Pekar et al. |
| 8,078,330 B2 | 12/2011 | Brickfield et al. |
| 8,096,140 B2 | 1/2012 | Seem |
| 8,105,029 B2 | 1/2012 | Egedal et al. |
| 8,109,255 B2 | 2/2012 | Stewart et al. |
| 8,121,818 B2 | 2/2012 | Gorinevsky |
| 8,126,575 B2 | 2/2012 | Attarwala |
| 8,145,329 B2 | 3/2012 | Pekar et al. |
| 8,180,493 B1 | 5/2012 | Laskow |
| 8,185,217 B2 | 5/2012 | Thiele |
| 8,200,346 B2 | 6/2012 | Thiele |
| 8,473,080 B2 | 6/2013 | Seem et al. |

(56) References Cited

U.S. PATENT DOCUMENTS

| | | |
|---|---|---|
| 8,495,888 B2 | 7/2013 | Seem |
| 8,600,561 B1 | 12/2013 | Modi et al. |
| 8,639,482 B2 | 1/2014 | Rasmussen et al. |
| 8,843,238 B2 | 9/2014 | Wenzel et al. |
| 8,903,554 B2 | 12/2014 | Stagner |
| 9,002,532 B2 | 4/2015 | Asmus |
| 9,235,657 B1 | 1/2016 | Wenzel et al. |
| 9,436,179 B1 | 9/2016 | Turney et al. |
| 9,696,054 B2 | 7/2017 | Asmus |
| 10,354,345 B2* | 7/2019 | Sloop ............... F24F 11/30 |
| 2004/0159713 A1 | 8/2004 | Schmidt et al. |
| 2005/0082053 A1 | 4/2005 | Halabi |
| 2005/0234596 A1 | 10/2005 | Rietschel |
| 2006/0065752 A1 | 3/2006 | Poirier |
| 2006/0116067 A1 | 6/2006 | Federspiel |
| 2007/0028632 A1 | 2/2007 | Liu |
| 2007/0277542 A1 | 12/2007 | Rao |
| 2008/0051940 A1 | 2/2008 | Aronstam et al. |
| 2009/0062969 A1 | 3/2009 | Chandra et al. |
| 2009/0255997 A1 | 10/2009 | Goldmann et al. |
| 2009/0313083 A1 | 12/2009 | Dillon et al. |
| 2009/0319090 A1 | 12/2009 | Dillon et al. |
| 2010/0006662 A1 | 1/2010 | Yonezawa et al. |
| 2010/0082162 A1 | 4/2010 | Mundy et al. |
| 2010/0087933 A1 | 4/2010 | Cheng |
| 2010/0094434 A1 | 4/2010 | Ballet et al. |
| 2010/0100246 A1 | 4/2010 | Josserand et al. |
| 2010/0161135 A1 | 6/2010 | Nerling |
| 2010/0211224 A1 | 8/2010 | Keeling et al. |
| 2010/0235004 A1 | 9/2010 | Thind |
| 2010/0269854 A1 | 10/2010 | Barbieri et al. |
| 2010/0282857 A1 | 11/2010 | Steinberg |
| 2010/0298993 A1 | 11/2010 | Eaton et al. |
| 2011/0022193 A1 | 1/2011 | Panaitescu |
| 2011/0022236 A1 | 1/2011 | Higgins |
| 2011/0048046 A1 | 3/2011 | Sommer et al. |
| 2011/0060424 A1 | 3/2011 | Havlena |
| 2011/0066258 A1 | 3/2011 | Torzhkov et al. |
| 2011/0066298 A1 | 3/2011 | Francino et al. |
| 2011/0077758 A1 | 3/2011 | Tran et al. |
| 2011/0088000 A1 | 4/2011 | Mackay |
| 2011/0112695 A1 | 5/2011 | Ma et al. |
| 2011/0125293 A1 | 5/2011 | Havlena |
| 2011/0137468 A1 | 6/2011 | Duncan |
| 2011/0189938 A1 | 8/2011 | Yoshii et al. |
| 2011/0190946 A1 | 8/2011 | Wong et al. |
| 2011/0213502 A1 | 9/2011 | Uden |
| 2011/0218771 A1 | 9/2011 | Seigel |
| 2011/0230131 A1 | 9/2011 | Gao et al. |
| 2011/0257789 A1 | 10/2011 | Stewart et al. |
| 2011/0301723 A1 | 12/2011 | Pekar et al. |
| 2012/0010757 A1 | 1/2012 | Francino et al. |
| 2012/0010758 A1 | 1/2012 | Francino et al. |
| 2012/0059351 A1 | 3/2012 | Nordh |
| 2012/0060505 A1 | 3/2012 | Fuller et al. |
| 2012/0109620 A1 | 5/2012 | Gaikwad et al. |
| 2012/0116546 A1 | 5/2012 | Sayyar-Rodsari |
| 2012/0316914 A1 | 12/2012 | Lee et al. |
| 2013/0073062 A1 | 3/2013 | Smith et al. |
| 2013/0085616 A1 | 4/2013 | Wenzel |
| 2013/0190940 A1* | 7/2013 | Sloop ............... G05B 15/02 700/291 |
| 2013/0345880 A1 | 12/2013 | Asmus |
| 2014/0249680 A1 | 9/2014 | Wenzel |
| 2015/0192911 A1* | 7/2015 | Sloop ............... G05B 15/02 700/291 |
| 2015/0316903 A1 | 11/2015 | Asmus et al. |
| 2016/0201933 A1 | 7/2016 | Hester et al. |
| 2017/0097177 A1* | 4/2017 | Azuma ............... F24F 11/89 |
| 2017/0206615 A1* | 7/2017 | Sloop ............... G06Q 50/06 |
| 2017/0212488 A1 | 7/2017 | Kummer et al. |
| 2018/0113482 A1* | 4/2018 | Vitullo ............ H04L 12/2823 |
| 2018/0252428 A1* | 9/2018 | Malcolm ............ F24F 11/46 |

OTHER PUBLICATIONS

Diederik Kingma and Jimmy Ba. Adam: A Method for Stochastic Optimization. In International Conference on Learning Representations (ICLR), 2015, 15 pages.
George EP Box, Gwilym M Jenkins, Gregory C Reinsel, and Greta M Ljung. Time Series Analysis: Forecasting and Control. John Wiley & Sons, 2015, chapters 13-15. 82 pages.
Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor. System Identification: Theory for the User (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609.05191, 2016, 44 pages.
Nevena et al. Data center cooling using model-predictive control, 10 pages.
Sergio Bittanti, Marco C Campi, et al. Adaptive Control of Linear Time Invariant Systems: The "Bet on the Best" Principle. Communications in Information & Systems, 6(4):299-320, 2006. 21 pages.
Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.
U.S. Appl. No. 13/802,154, filed Mar. 13, 2013, Johnson Controls Technology Company.
Chang et al., Optimal chiller sequencing by branch and boun method of saving energy, 2004 Elsevier, 15 pages.
Deng et al., Optimal Scheduling of Chiller Plant with Thermal Energy Storage using Mixed Integer Linear Programming, Jun. 17-19, 2013, American Control Conference (ACC) 2013, 6 pages.
Gunter et al., Optimal Design of Grid-Connected PEV Charging Systems With Integrated Distributed Resources, IEEE Transactions on Smart Grid 4, No. 2 (n.d.): 956-967, 13 pages.
Kapoor et al., Improved Large-Scale Process Cooling Operation through Energy Optimization, Nov. 22, 2013, Process 2013, 1, 312-329; doi: 10.3390/pr1030312.
Zakeri et al., Optimization of Demand Response Through Peak Shaving, Oct. 25, 2013, 9 pages.
Examination Report for European Application No. 16154938.1, dated Mar. 27, 2017, 5 pages.
Examination Report for European Application No. 16154938.1, dated Oct. 11, 2017, 4 pages.
Examination Report for European Application No. 16154940.7, dated Mar. 28, 2017, 5 pages.
Examination Report for European Application No. 16154940.7, dated Oct. 16, 2017, 4 pages.
Extended Search Report for European Application No. 16154938.1, dated Jun. 23, 2016, 8 pages.
Extended Search Report for European Application No. 16154940.7, dated Jun. 30, 2016, 7 pages.
Office Action for U.S. Appl. No. 14/634,615, dated Jul. 11, 2017, 13 pages.

(56) References Cited

OTHER PUBLICATIONS

Office Action for U.S. Appl. No. 14/666,119, dated Feb. 27, 2017, 7 pages.
Notice of Allowance for U.S. Appl. No. 13/533,848, dated Dec. 1, 2014, 8 pages.
Notice of Allowance for U.S. Appl. No. 14/666,119, dated May 9, 2017, 7 pages.
International Search Report and Written Opinion for International Application No. PCT/US2018/062572 dated May 29, 2019, 18 pages.

* cited by examiner

MULTISTAGE HVAC SYSTEM WITH DISCRETE DEVICE SELECTION PRIORITIZATION

BACKGROUND

The present disclosure relates generally to a building control system and more particularly to a control system for a multistage heating or cooling process. The multistage heating or cooling process can include one or more discrete (on/off) devices configured to provide a defined capacity of heating or cooling.

The main assets of a building control system typically include HVAC equipment such as chillers, condensers, fans, rooftop units, etc. As an example, a rooftop unit may include one or more discrete devices (e.g., compressors) that can be turned on and off in various combinations to achieve various capacities of cooling. The lifetime and performance of these devices can be negatively affected if control decisions are not made in an appropriate manner. Previous approaches to this problem have resulted in user dissatisfaction.

SUMMARY

One implementation of the present disclosure is a controller for a plurality of devices of a building control system that operate in parallel to provide a desired capacity of heating or cooling for a building space. The controller includes a capacity identifier configured to identify the desired capacity of heating or cooling for the building space. The controller includes a combination finder configured to generate a list of combinations of the plurality of devices that can be energized to provide the desired capacity of heating or cooling, where each of the combinations comprises one or more of the plurality of devices. The controller further includes a combination filter configured to remove any combinations from the list of combinations that do not meet one or more requirements. The controller further includes a combination selector configured to select one of the combinations from the list of combinations based on at least one of a runtime or a transition count associated with each of the combinations. The controller further includes a signal generator configured to generate one or more control signals in accordance with the selected combination and operate the plurality of devices using the control signals.

In some embodiments, the controller is configured to operate the plurality of devices by providing the one or more control signals to the plurality of devices, the one or more control signals causing one or more of the plurality of devices to transition between an off state and an on state in accordance with the selected combination.

In some embodiments, the capacity identifier is configured to receive a load setpoint and identify the desired capacity of heating or cooling based on the load setpoint.

In some embodiments, the load setpoint comprises at least one of a cooling load or a heating load to be provided by the plurality of devices.

In some embodiments, the controller is configured to send resource consumption data to another controller in the building control system.

In some embodiments, the controller is configured to receive device information from each device of the plurality of devices, the device information indicating at least one of a current state of the device, an amount of time since the device transitioned into the current state, or a cumulative runtime of the device.

In some embodiments, each runtime is associated with one of the combinations and indicates a total runtime of the plurality of devices in the associated combination.

In some embodiments, the combination selector is configured to select the combination with a lowest total runtime.

In some embodiments, each transition count is associated with one of the combinations and indicates a total number of on/off transitions required to achieve an on/off state for each of the plurality of devices in the associated combination.

In some embodiments, the combination selector is configured to select the combination with the lowest transition count.

Another implementation of the present disclosure is a method for controlling a plurality of devices of a building control system that operate in parallel to provide a desired capacity of heating or cooling for a building space. The method includes identifying a desired capacity of heating or cooling for the building space. The method further includes generating a list of combinations of the plurality of devices that can be energized to provide the desired capacity of heating or cooling, where each of the combinations comprises one or more of the plurality of devices. The method further includes removing any of the combinations from the list of combinations that do not meet one or more requirements. The method further includes selecting a combination from the list of combinations based on at least one of a runtime or a transition count associated with each of the combinations. The method further includes generating one or more control signals in accordance with the selected combination and operating the plurality of devices using the control signals.

In some embodiments, the method further includes operating the plurality of devices by providing the one or more control signals to the plurality of devices, the one or more control signals causing one or more of the plurality of devices to transition between an off state and an on state in accordance with the selected combination.

In some embodiments, the method further includes receiving a load setpoint and identifying the desired capacity of heating or cooling based on the load setpoint.

In some embodiments, the load setpoint comprises at least one of a cooling load or a heating load to be provided by the plurality of devices.

In some embodiments, the method further includes sending resource consumption data to another controller in the building control system.

In some embodiments, the method further includes receiving device information from each device of the plurality of devices, the device information indicating at least one of a current state of the device, an amount of time since the device transitioned into the current state, or a cumulative runtime of the device.

In some embodiments, each runtime is associated with one of the combinations and indicates a total runtime of the plurality of devices in the associated combination.

In some embodiments, the method further includes selecting the combination with the lowest total runtime.

In some embodiments, each transition count is associated with one of the combinations and indicates a total number of on/off transitions required to achieve an on/off state for each of the plurality of devices in the associated combination.

In some embodiments, the method further includes selecting the combination with the lowest transition count.

Those skilled in the art will appreciate this summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a building control system with one or more controllers configured to optimize the selection of discrete devices is shown, according to various exemplary embodiments. A device controller includes a capacity identifier, a combination finder, a combination filter, a combination selector, and a signal generator. The lifetime and performance of discrete devices in a building control system can be significantly improved if control decisions are made in a manner that optimizes runtime and/or start counts.

The capacity identifier can be configured to determine a desired capacity of heating or cooling for a given building space. The combination finder can be configured to generate a list of possible discrete device combinations that can be energized to deliver a target capacity of heating or cooling. The combination filter can be configured to remove combinations from a list of combinations that do not meet one or more requirements. The combination selector can be configured to select a combination from a filtered list of combinations based on at least one of a runtime or start count associated with one or more devices. The signal generator can be configured to generate control signals that can be sent to one or more devices based on a selected combination.

In some embodiments, the controller is configured to perform a discrete device selection process to optimize the selection of discrete devices to be energized in a building control system. The process includes generating a list of discrete device combinations that can be energized to achieve a target capacity of heating or cooling. If more than one combination exists, the process can continue with filtering the list of combinations according to one or more requirements. If more than one combination still exists, the process can continue with selecting a combination of devices based on at least one of a runtime or start count associated with one or more devices. A selected combination can be used to generate control signals to be sent to one or more devices.

Building With HVAC System

Figure 1:
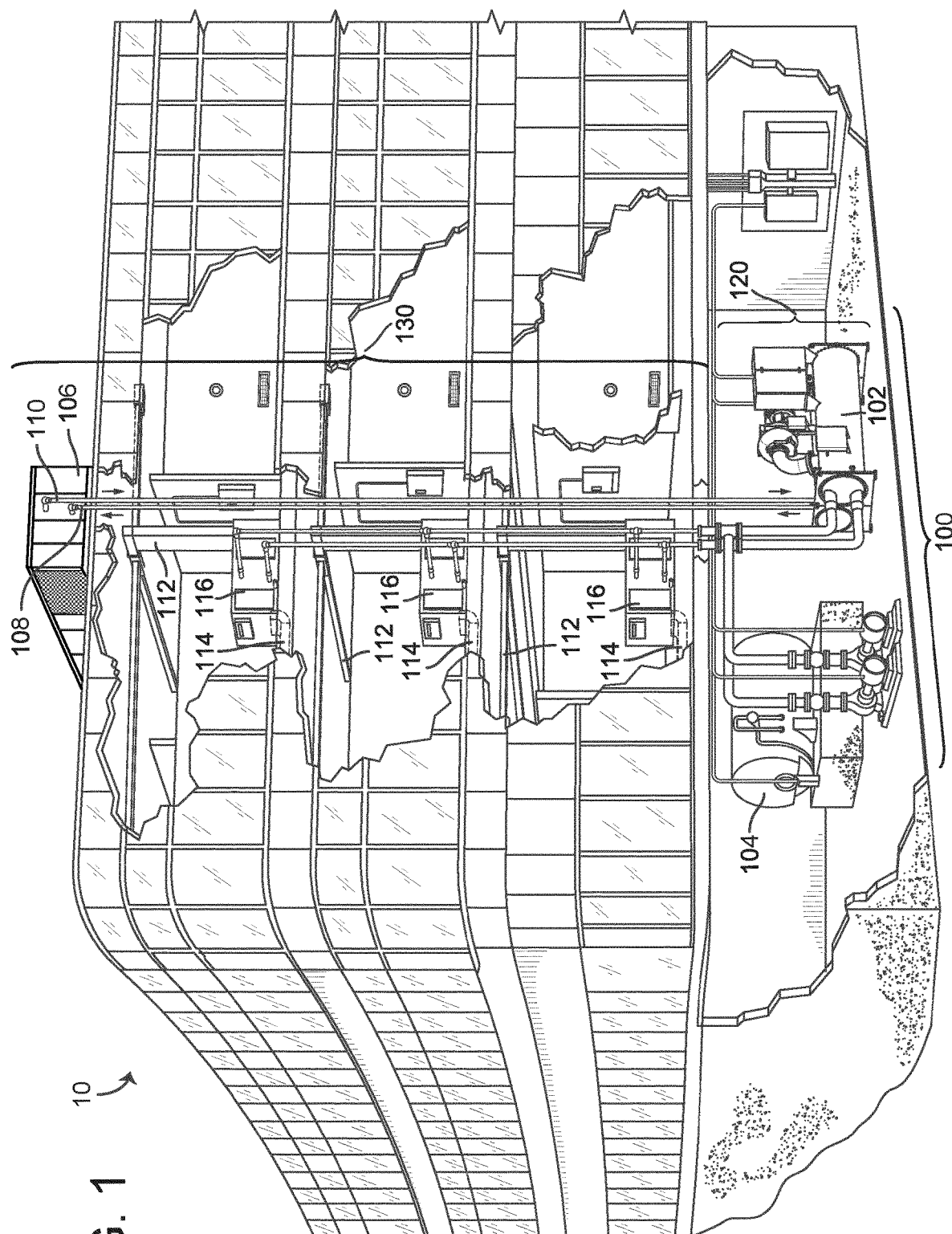
FIG. 1 is a drawing of a building equipped with a HVAC system, according to an exemplary embodiment.

Referring now to FIG. 1, a perspective view of a building 10 is shown. Building 10 is served by a building automation system (BAS). A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant and Control System

Figure 2:
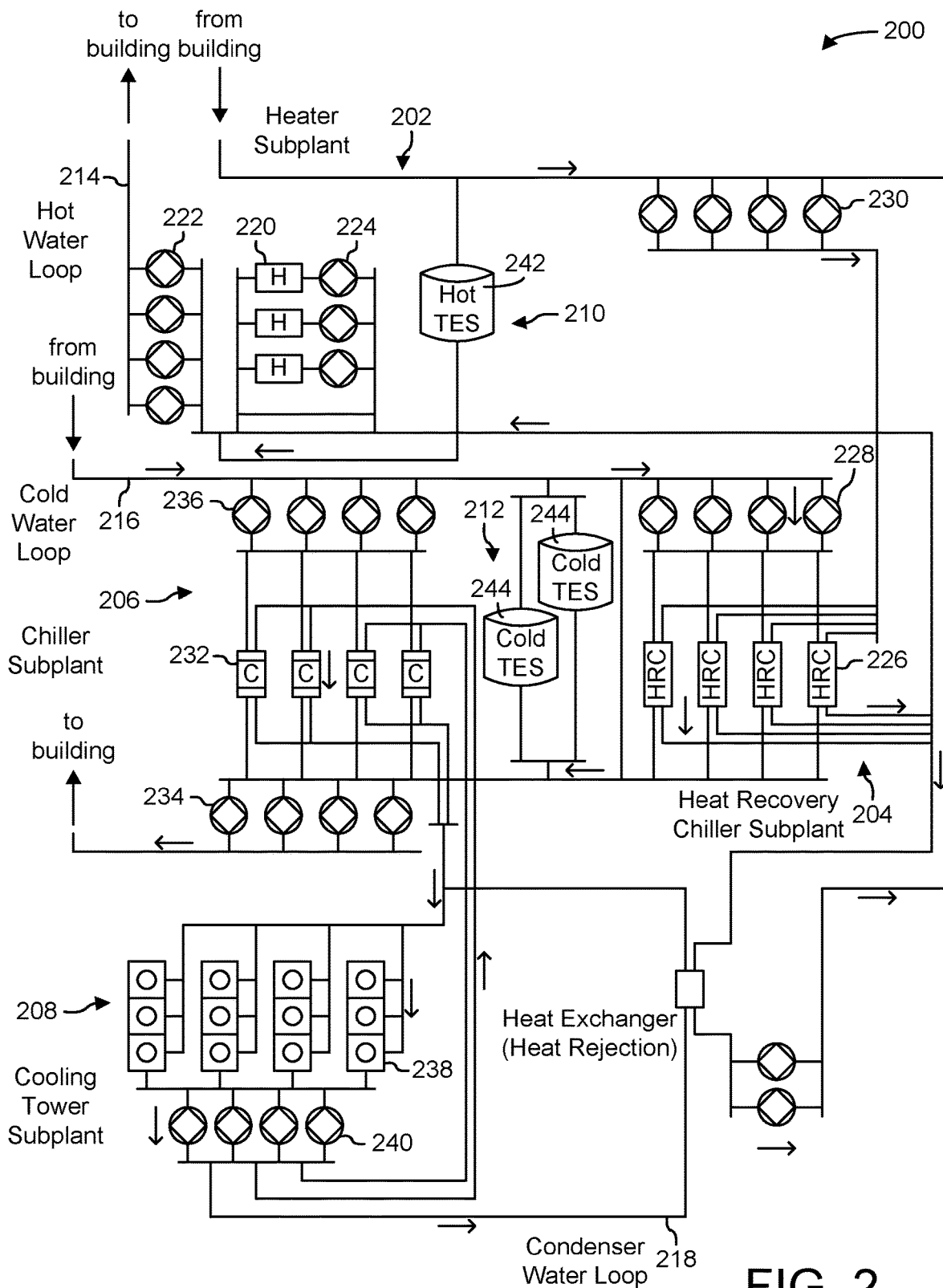
FIG. 2 is a schematic of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Figure 3:
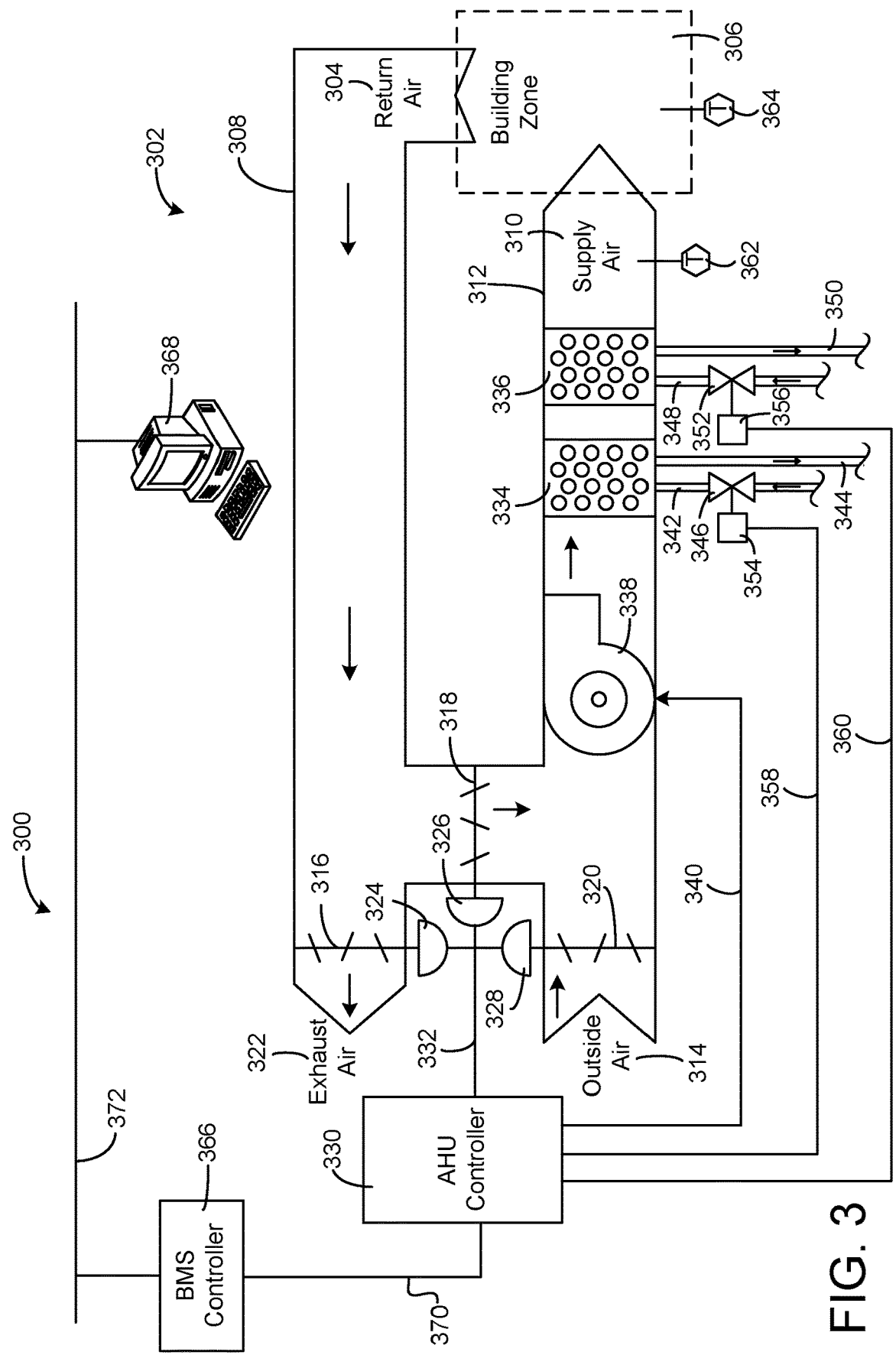
FIG. 3 is a block diagram of an airside system which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
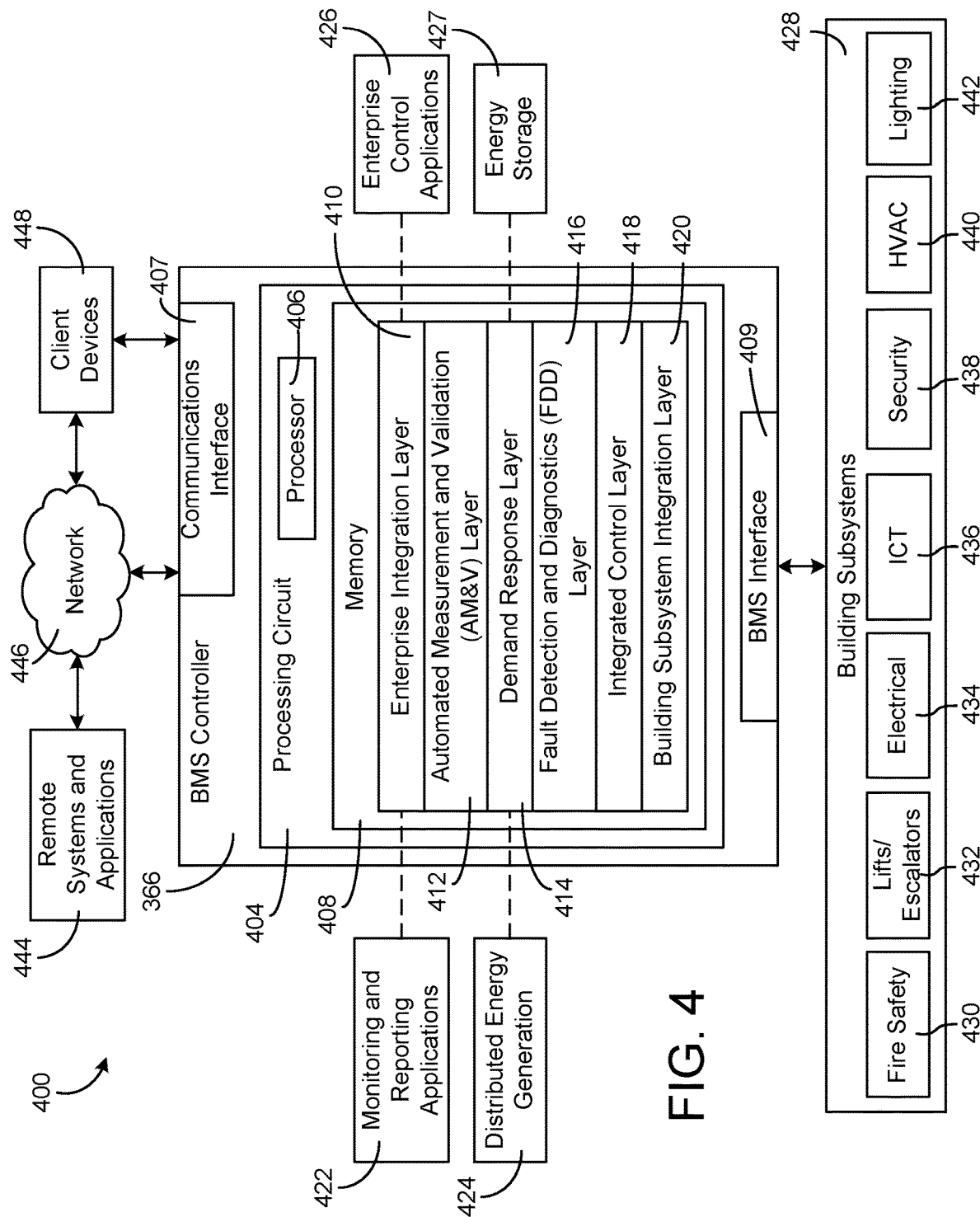
FIG. 4 is a block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
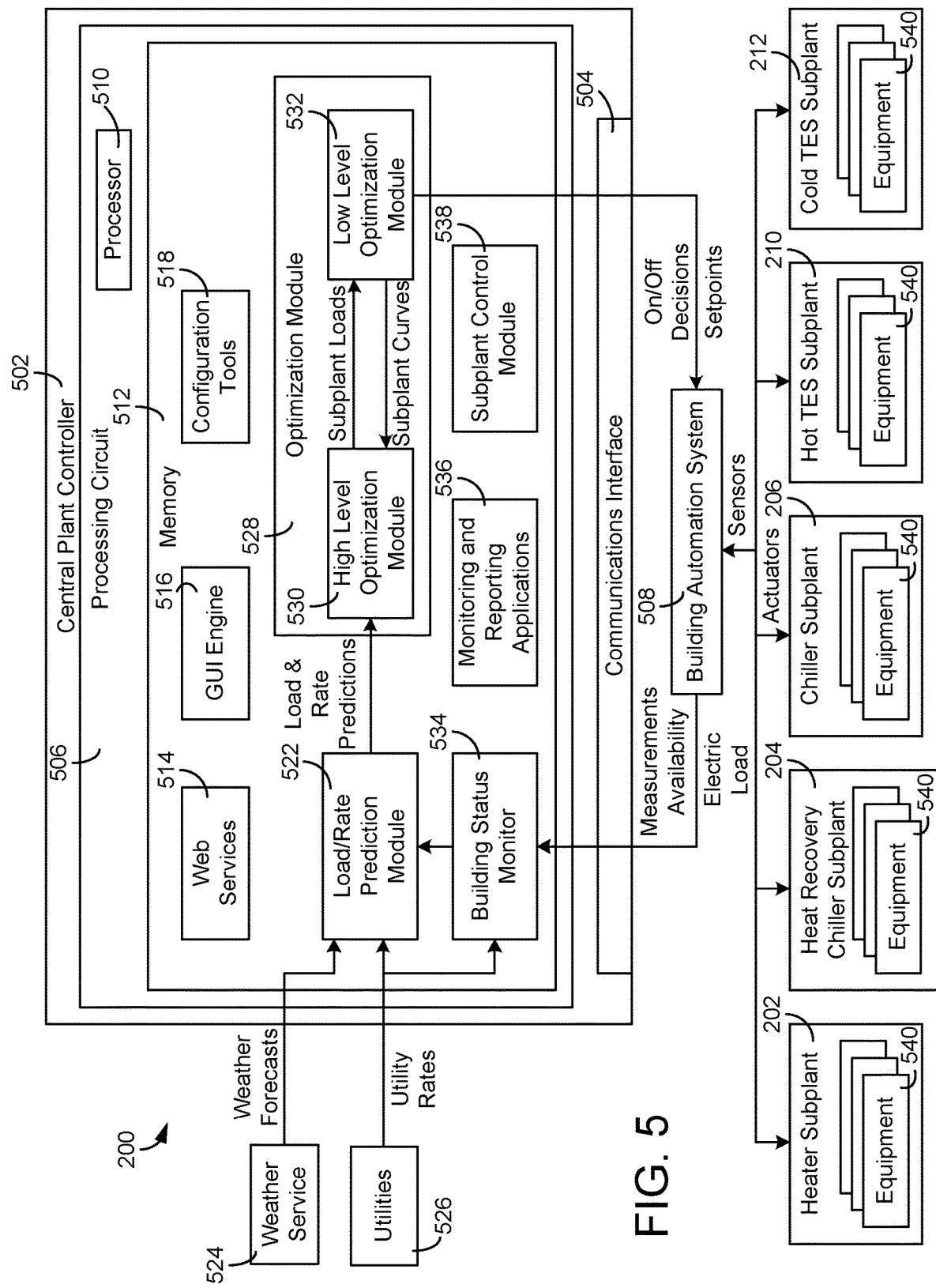
FIG. 5 is a block diagram of a central plant controller, according to some embodiments.

Referring now to FIG. 5, a block diagram illustrating a central plant system 200 is shown, according to an exemplary embodiment. System 500 is shown to include a central plant controller 502, a building automation system (BAS) 508, and a plurality of subplants 202-212. Subplants 202-212 may be the same as previously described with reference to FIG. 2. For example, subplants 202-212 are shown to include a heater subplant 202, a heat recovery chiller subplant 204, a chiller subplant 206, a hot TES subplant 210, and a cold TES subplant 212.

Each of subplants 202-212 is shown to include equipment 540 that can be controlled by central plant controller 502 and/or building automation system 508 to optimize the performance of central plant 200. Equipment 540 may include, for example, heating devices 220, chillers 232, heat recovery heat exchangers 226, cooling towers 238, thermal energy storage devices 242-244, pumps, valves, and/or other devices of subplants 202-212. Individual devices of equipment 540 can be turned on or off to adjust the thermal energy load served by each of subplants 202-212. In some embodiments, individual devices of equipment 540 can be operated at variable capacities (e.g., operating a chiller at 10% capacity or 60% capacity) according to an operating setpoint received from central plant controller 502.

In some embodiments, one or more of subplants 202-212 includes a subplant level controller configured to control the equipment 540 of the corresponding subplant. For example, central plant controller 502 may determine an on/off configuration and global operating setpoints for equipment 540. In response to the on/off configuration and received global operating setpoints, the subplant controllers may turn individual devices of equipment 540 on or off, and implement specific operating setpoints (e.g., damper position, vane position, fan speed, pump speed, etc.) to reach or maintain the global operating setpoints.

In some embodiments, the subplant level controllers receive subplant load setpoints from central plant controller 502. Each subplant level controller may use the subplant load setpoint for the corresponding subplant to select one or more devices of the equipment 540 within the subplant to activate or deactivate in order to meet the subplant load setpoint in an energy-efficient manner. In other embodiments, the equipment selection and staging decisions (i.e., deciding which devices to turn on/off) are performed by a low level optimizer 532 within central plant controller 502.

BAS 508 may be configured to monitor conditions within a controlled building or building zone. For example, BAS 508 may receive input from various sensors (e.g., temperature sensors, humidity sensors, airflow sensors, voltage sensors, etc.) distributed throughout the building and may report building conditions to central plant controller 502. Building conditions may include, for example, a temperature of the building or a zone of the building, a power consumption (e.g., electric load) of the building, a state of one or more actuators configured to affect a controlled state within the building, or other types of information relating to the controlled building. BAS 508 may operate subplants 202-212 to affect the monitored conditions within the building and/or to serve the thermal energy loads of the building.

BAS 308 may receive control signals from central plant controller 502 specifying on/off states and/or setpoints for equipment 540. BAS 508 may control equipment 540 (e.g., via actuators, power relays, etc.) in accordance with the control signals provided by central plant controller 502. For example, BAS 508 may operate equipment 540 using closed loop control to achieve the setpoints specified by central plant controller 502. In various embodiments, BAS 508 may be combined with central plant controller 502 or may be part of a separate building automation system. According to an exemplary embodiment, BAS 508 is a METASYS® brand building automation system, as sold by Johnson Controls, Inc.

Central plant controller 502 may monitor the status of the controlled building using information received from BAS 508. Central plant controller 502 may be configured to predict the thermal energy loads (e.g., heating loads, cooling loads, etc.) of the building for plurality of time steps in a prediction window (e.g., using weather forecasts from a weather service 524). Central plant controller 502 may generate on/off decisions and/or setpoints for equipment 540 to minimize the cost of energy consumed by subplants 202-212 to serve the predicted heating and/or cooling loads for the duration of the prediction window. According to an exemplary embodiment, central plant controller 502 is integrated within a single computer (e.g., one server, one housing, etc.). In various other exemplary embodiments, central plant controller 502 can be distributed across multiple servers or computers (e.g., that can exist in distributed locations). In another exemplary embodiment, central plant controller 502 is integrated with a smart building manager that manages multiple building systems and/or combined with BAS 508.

Central plant controller 502 is shown to include a communications interface 504 and a processing circuit 506. Communications interface 504 may include wired or wireless interfaces (e.g., jacks, antennas, transmitters, receivers, transceivers, wire terminals, etc.) for conducting data communications with various systems, devices, or networks. For example, communications interface 504 may include an Ethernet card and port for sending and receiving data via an Ethernet-based communications network and/or a WiFi transceiver for communicating via a wireless communications network. Communications interface 504 may be configured to communicate via local area networks or wide area networks (e.g., the Internet, a building WAN, etc.) and may use a variety of communications protocols (e.g., BACnet, IP, LON, etc.).

Communications interface 504 may be a network interface configured to facilitate electronic data communications between central plant controller 502 and various external systems or devices (e.g., BAS 508, subplants 202-212, etc.). For example, central plant controller 502 may receive information from BAS 508 indicating one or more measured states of the controlled building (e.g., temperature, humidity, electric loads, etc.) and one or more states of subplants 202-212 (e.g., equipment status, power consumption, equipment availability, etc.). Communications interface 504 may receive inputs from BAS 508 and/or subplants 202-212 and may provide operating parameters (e.g., on/off decisions, setpoints, etc.) to subplants 202-212 via BAS 508. The operating parameters may cause subplants 202-212 to activate, deactivate, or adjust a setpoint for various devices of equipment 540.

Still referring to FIG. 5, processing circuit 506 is shown to include a processor 510 and memory 512. Processor 510 may be a general purpose or specific purpose processor, an application specific integrated circuit (ASIC), one or more field programmable gate arrays (FPGAs), a group of processing components, or other suitable processing components. Processor 510 may be configured to execute computer code or instructions stored in memory 512 or received from other computer readable media (e.g., CDROM, network storage, a remote server, etc.).

Memory 512 may include one or more devices (e.g., memory units, memory devices, storage devices, etc.) for storing data and/or computer code for completing and/or facilitating the various processes described in the present disclosure. Memory 512 may include random access memory (RAM), read-only memory (ROM), hard drive storage, temporary storage, non-volatile memory, flash memory, optical memory, or any other suitable memory for storing software objects and/or computer instructions. Memory 512 may include database components, object code components, script components, or any other type of information structure for supporting the various activities and information structures described in the present disclosure. Memory 512 may be communicably connected to processor 510 via processing circuit 506 and may include computer code for executing (e.g., by processor 510) one or more processes described herein.

Still referring to FIG. 5, memory 512 is shown to include a building status monitor 534. Central plant controller 502 may receive data regarding the overall building or building space to be heated or cooled with central plant 200 via building status monitor 534. In an exemplary embodiment, building status monitor 534 may include a graphical user interface component configured to provide graphical user interfaces to a user for selecting building requirements (e.g., overall temperature parameters, selecting schedules for the building, selecting different temperature levels for different building zones, etc.).

Central plant controller 502 may determine on/off configurations and operating setpoints to satisfy the building requirements received from building status monitor 534. In some embodiments, building status monitor 534 receives, collects, stores, and/or transmits cooling load requirements, building temperature setpoints, occupancy data, weather data, energy data, schedule data, and other building parameters. In some embodiments, building status monitor 534 stores data regarding energy costs, such as pricing information available from utilities 526 (energy charge, demand charge, etc.).

Still referring to FIG. 5, memory 512 is shown to include a load/rate predictor 522. Load/rate predictor 522 may be configured to predict the thermal energy loads ($\hat{l}_k$) of the building or campus for each time step k (e.g., k=1 ... n) of an optimization period. Load/rate predictor 522 is shown receiving weather forecasts from a weather service 524. In some embodiments, load/rate predictor 522 predicts the thermal energy loads $\hat{l}_k$ as a function of the weather forecasts. In some embodiments, load/rate predictor 522 uses feedback from BAS 508 to predict loads $\hat{l}_k$. Feedback from BAS 508 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 522 receives a measured electric load and/or previous measured load data from BAS 508 (e.g., via building status monitor 334). Load/rate predictor 522 may predict loads $\hat{l}_k$ as a function of a given weather forecast ($\hat{\phi}_w$), a day type (clay), the time of day (t), and previous measured load data ($Y_{k-1}$). Such a relationship is expressed in the following equation:

$$\hat{l}_k = f(\hat{\phi}_w, \text{day}, t | Y_{k-1})$$

In some embodiments, load/rate predictor 522 uses a deterministic plus stochastic model trained from historical load data to predict loads $\hat{l}_k$. Load/rate predictor 522 may use any of a variety of prediction methods to predict loads $\hat{l}_k$ (e.g., linear regression for the deterministic portion and an AR model for the stochastic portion). Load/rate predictor 522 may predict one or more different types of loads for the building or campus. For example, load/rate predictor 522 may predict a hot water load $\hat{l}_{Hot,k}$ and a cold water load $\hat{l}_{Cold,k}$ for each time step k within the prediction window.

Load/rate predictor 522 is shown receiving utility rates from utilities 526. Utility rates may indicate a cost or price per unit of a resource (e.g., electricity, natural gas, water, etc.) provided by utilities 526 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 526 or predicted utility rates estimated by load/rate predictor 522.

In some embodiments, the utility rates include demand charges for one or more resources provided by utilities 526. A demand charge may define a separate cost imposed by utilities 526 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, central plant optimizer 528 may be configured to account for demand charges in the high level optimization process performed by high level optimizer 530. Utilities 526 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate predictor 522 may store the predicted loads $\hat{l}_k$ and the utility rates in memory 312 and/or provide the predicted loads $\hat{l}_k$ and the utility rates to central plant optimizer 528. Central plant optimizer 528 may use the predicted loads $\hat{l}_k$ and the utility rates to determine an optimal load distribution for subplants 202-212 and to generate on/off decisions and setpoints for equipment 540.

Still referring to FIG. 5, memory 512 is shown to include an central plant optimizer 528. Central plant optimizer 528 may perform a cascaded optimization process to optimize the performance of central plant 200. For example, central plant optimizer 528 is shown to include a high level optimizer 530 and a low level optimizer 532. High level optimizer 530 may control an outer (e.g., subplant level) loop of the cascaded optimization. High level optimizer 530 may determine an optimal distribution of thermal energy loads across subplants 202-212 for each time step in the prediction window in order to optimize (e.g., minimize) the cost of energy consumed by subplants 202-212. Low level optimizer 532 may control an inner (e.g., equipment level) loop of the cascaded optimization. Low level optimizer 532 may determine how to best run each subplant at the load setpoint determined by high level optimizer 530. For example, low level optimizer 532 may determine on/off states and/or operating setpoints for various devices of equipment 540 in order to optimize (e.g., minimize) the energy consumption of each subplant while meeting the thermal energy load setpoint for the subplant.

Still referring to FIG. 5, memory 512 is shown to include a subplant monitor 538. Subplant monitor 538 may store historical data regarding past operating statuses, past operating setpoints, and instructions for calculating and/or implementing control parameters for subplants 202-212. Subplant monitor 538 may also receive, store, and/or transmit data regarding the conditions of individual devices of equipment 540, such as operating efficiency, equipment degradation, a date since last service, a lifespan parameter, a condition grade, or other device-specific data. Subplant monitor 538 may receive data from subplants 202-212 and/or BAS 508 via communications interface 504. Subplant monitor 538 may also receive and store on/off statuses and operating setpoints from low level optimizer 532.

Data and processing results from central plant optimizer 528, subplant monitor 538, or other modules of central plant controller 502 may be accessed by (or pushed to) monitoring and reporting applications 536. Monitoring and reporting applications 536 may be configured to generate real time system health dashboards that can be viewed and navigated by a user (e.g., a central plant engineer). For example, monitoring and reporting applications 536 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Still referring to FIG. 5, central plant controller 502 may include one or more GUI servers, web services 514, or GUI engines 516 to support monitoring and reporting applications 536. In various embodiments, applications 536, web services 514, and GUI engine 516 may be provided as separate components outside of central plant controller 502 (e.g., as part of a smart building manager). Central plant controller 502 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 502 may be configured to provide the results of any such processing to other databases, tables, XML files, or other data structures for further querying, calculation, or access by, for example, external monitoring and reporting applications.

Central plant controller 502 is shown to include configuration tools 518. Configuration tools 518 can allow a user to define (e.g., via graphical user interfaces, via prompt-driven wizards, etc.) how central plant controller 502 should react to changing conditions in the central plant subsystems. In an exemplary embodiment, configuration tools 518 allow a user to build and store condition-response scenarios that can cross multiple central plant devices, multiple building systems, and multiple enterprise control applications (e.g., work order management system applications, entity resource planning applications, etc.). For example, configuration tools 518 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 518 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Discrete Device Optimization

Figure 6:
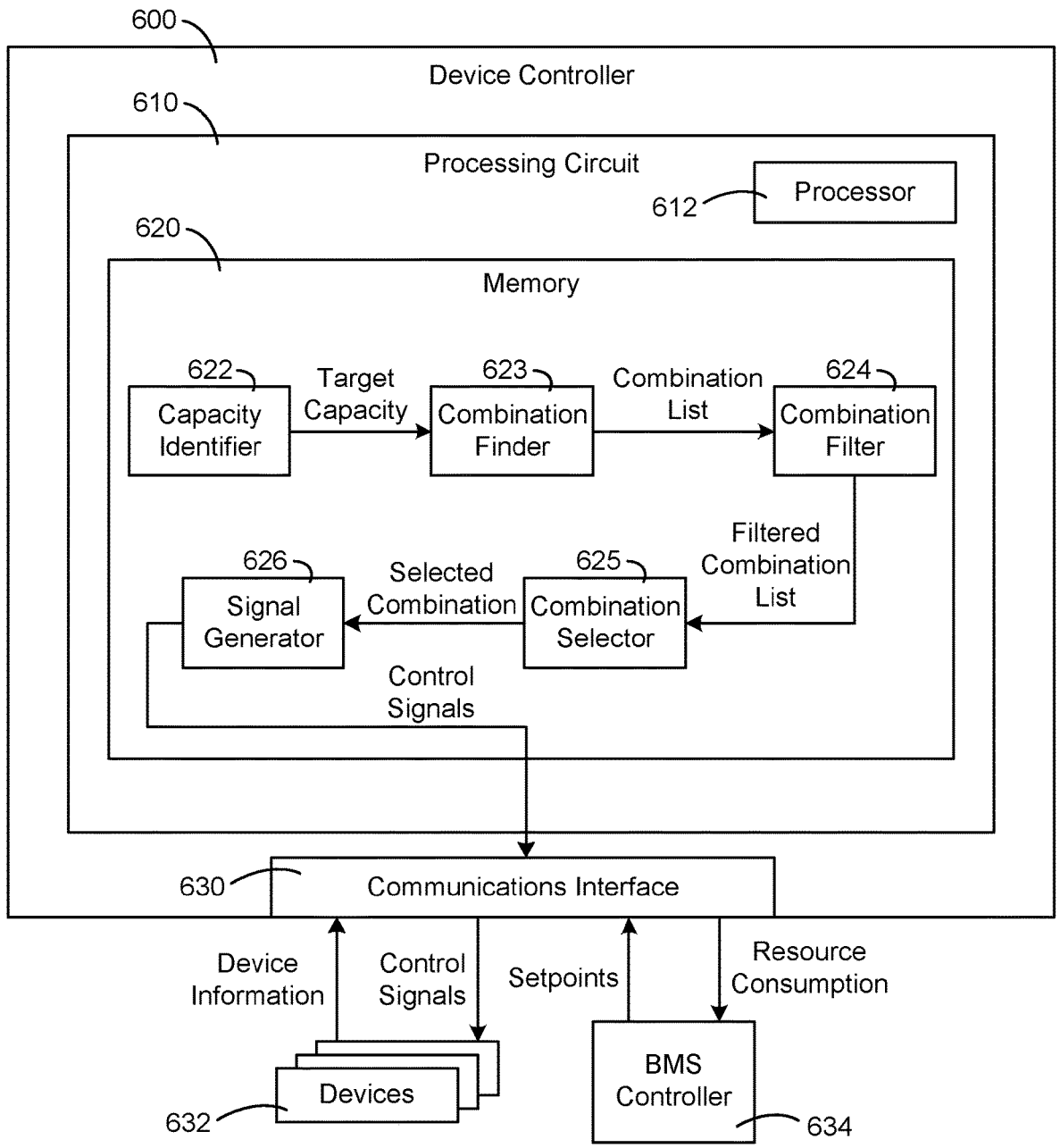
FIG. 6 is a block diagram of a device controller, according to some embodiments.

Referring now to FIG. 6, a device controller 600 that can send control signals to one or more devices is shown, according to an exemplary embodiment. Device controller 600 can be a controller or part of a controller in a building control system, building management system, HVAC system (e.g., a rooftop unit controller, a chiller controller, etc.) or central plant control system (e.g., system 200). In some embodiments, device controller 600 is configured to perform some or all of the functions of low level optimization module 532, as described with reference to FIG. 5. For example, device controller 600 can be configured to receive a load setpoint from high level optimization module 530 and determine an optimal combination of devices to turn on/off to satisfy the load setpoint.

Device controller 600 is shown to include a processing circuit 610, a processor 612, and a memory 620. Device controller 600 is also shown to include a communications interface 630 that can be used to communicate with one or more discrete (on/off) devices 632 and a BMS controller 634. Devices 632 include compressors, actuators, pumps, and fans to name a few examples. While device controller 600 is only shown to control one or more discrete devices 632, it should be noted that device controller 600 can also control any number or type of additional devices or equipment in a building control system. In some embodiments, some or all of devices 632 are configured to operate in parallel to provide a variable amount of capacity (e.g., heating, cooling, airflow, chilled fluid, heated fluid, etc.) into a common discharge (e.g., a duct or a pipe). Device controller 600 can be configured to optimize a set of control decisions related to a multistage heating or cooling process performed by an HVAC system. A multistage heating or cooling process can use one or more discrete devices 632 in parallel to reach a target capacity level (e.g., 150 tons of cooling). In order to reduce the degradation of devices 632, device controller 600 can be configured to activate and deactivate devices 632 such that the start counts and/or runtimes are distributed evenly or substantially across devices 632. Device controller 600 is shown to include a collection of components designed to achieve this goal such as capacity identifier 622, combination finder 623, combination filter 624, combination selector 625, and signal generator 626.

Capacity identifier 622 can be configured to identify a target capacity level of heating or cooling desired to heat or cool a given space in a building. In some embodiments, capacity identifier 622 receives setpoints via communications interface 630 from a BMS controller 634. For embodiments in which controller 600 is implemented as low level optimization module 532, capacity identifier 622 can receive setpoints from high level optimization module 530. The setpoints can include a target capacity (e.g., a heating load, a cooling load, an electric load, etc.) or a target flow rate (e.g., chilled water flow rate, hot water flow rate, etc.) to name a few examples. For a multistage cooling process, the target capacity can be 150 tons of cooling (525 kW), for example. The target capacity can be used to determine which of devices 632 can be energized in order to deliver an appropriate amount of heating or cooling to a given space.

Combination finder 623 can be configured to find all possible combinations of discrete devices 632 that can be energized to deliver a desired capacity of heating or cooling. For example, in a multistage cooling process with five compressors, combination finder 623 can determine which on/off combinations of compressors can deliver the target capacity. For example, combination finder 623 can calculate the total operating capacity for all devices 632 that would be active in a given combination without including the capacity of any devices 632 that would be inactive in that combination. In some embodiments, device information received from devices 632 is used to determine a list of possible combinations. Device information can include a current operating status, a capacity, a total runtime (i.e., over the lifetime of the device), and a transition count, for example. This list of combinations can ultimately be used to determine which discrete devices 632 should be turned on or off to deliver a target system capacity.

Combination filter 624 can be configured to remove any combinations from a list of possible combinations that do not meet one or more requirements. In some embodiments, a minimum runtime requirement is applied for each of devices 632. The minimum runtime requirement may specify that a device 632 cannot be switched on or off unless it has remained in its current operating state (i.e., on or off) for a minimum amount of time. For example, the minimum runtime for a compressor may specify that the compressor must remain on or off for at least one hour before it is switched to the opposite operating state. If a combination requires that a certain compressor transitions from on to off, but this compressor was just turned on thirty minutes ago, then that combination can be filtered out of the list of combinations by combination filter 624. The ability to avoid constant on/off switching in this manner can increase the lifetime and performance of discrete devices involved in a multistage heating or cooling process. Combination filter 624 can be configured to apply any number of requirements to a list of discrete device combinations.

Combination selector 625 can be configured to generate a list of transition counts and/or runtimes associated with each remaining combination in the filtered list of combinations generated by combination filter 624. In some embodiments, device controller 600 is configured to prioritize either runtimes or transition counts. Combination selector 625 can be configured to calculate a total number of transitions associated with each possible combination in the filtered list of combinations. For example, if a combination involves three devices 632 being turned on (i.e., switched from off to on) and two devices 632 being turned off (i.e., switched from on to off), then the total transition count would be five. If device controller 600 is configured to prioritize start counts, then combination selector 625 can be configured to select the combination with the lowest total transition count.

In some embodiments, combination selector 625 is configured to calculate a total runtime associated with all discrete devices 632 that will be energized in a combination. The total runtime of the devices 632 that will be energized in a combination may be the cumulative runtime of the energized devices 632 over the lifetime of the energized devices 632 (i.e., the total amount of time the energized devices have run over their lifetimes). In some embodiments, combination selector 625 is configured to track the cumulative runtime of each device 632. For example, each time a device 632 is energized, prioritization controller 628 can add the amount of time that the device remains energized to the cumulative runtime for that device 632. Accordingly, each of devices 632 may have a cumulative runtime that is known to combination selector 625.

To determine the total runtime of a combination, combination selector 625 can add the cumulative runtimes of the devices 632 that will be energized in that combination. For example, a potential combination may result in two compressors being energized. If one of the compressors has a cumulative runtime of 150 hours and the other compressor has a cumulative runtime of 350 hours, then the cumulative runtimes for those two compressors can be added together to obtain a total runtime (e.g., 150 hours+350 hours=500 hours). If device controller 600 is configured to prioritize runtimes, then combination selector 625 can be configured to select the combination with the lowest total runtime.

In some embodiments, combination selector 625 is configured to include the amount of time that the energized devices 632 will remain energized in the cumulative runtimes. For example, if the control decisions made by controller 600 will be applied to devices 632 for a duration of 15 minutes, then the cumulative runtimes for each device 632 can be incremented by 15 minutes. Accordingly, the total runtime for the two compressors in the previous example may be calculated as 500.5 hours (e.g., 150 hours of past runtime for the first compressor+0.25 hours of planned runtime for the first compressor+350 hours of past runtime for the second compressor+0.25 hours of planned runtime for the second compressor=500.5 hours).

In some embodiments, combination selector 625 is configured to use a combination of the total transition count and the total runtime to determine which combination to select. For example, if the total transition count or the total runtime is equal for more than one combination, combination selector 625 can use the other factor as a tie-breaker. If both the total number of transitions and the total runtime are equal for multiple combinations of devices 632, combination selector 625 can be configured to select the first of the listed combinations.

Signal generator 626 can be configured to generate control signals that can be sent to one or more devices 632 based on a selected combination. The control signals can be used to activate or deactivate one or more devices 632. For example, if combination selector 625 determines that a certain compressor should transition from off to on, signal generator 626 can be configured to generate a signal with an increased magnitude and/or frequency that can be sent to the compressor through communications interface 630. In this manner, device controller 600 can optimize a set of control decisions when operating one or more devices 632 involved in a multistage heating or cooling process.

Communications interface 630 can be configured to communicate with a plurality of devices in a building control system. For example, device controller 600 can communicate with BMS controller 634, optimization module 528, or any high level or low level devices in a building control system. Communications interface 630 can use any communication protocol to establish these connections (e.g., NFC, Bluetooth, Wi-Fi, direct cables, BACnet, LonWorks, WAN, Internet, cellular network, etc.). In some embodiments, a BMS controller 634 communicates setpoints (e.g., target system capacity) to device controller 600. Device controller 600 can communicate information about the devices and equipment it controls (e.g., resource consumption) to BMS controller 634. Device controller 600 can be configured to send control signals (e.g., on/off decisions) to a plurality of devices 632. In return, devices 632 can send device information (e.g., runtimes, start counts) back to device controller 600.

Figure 7:
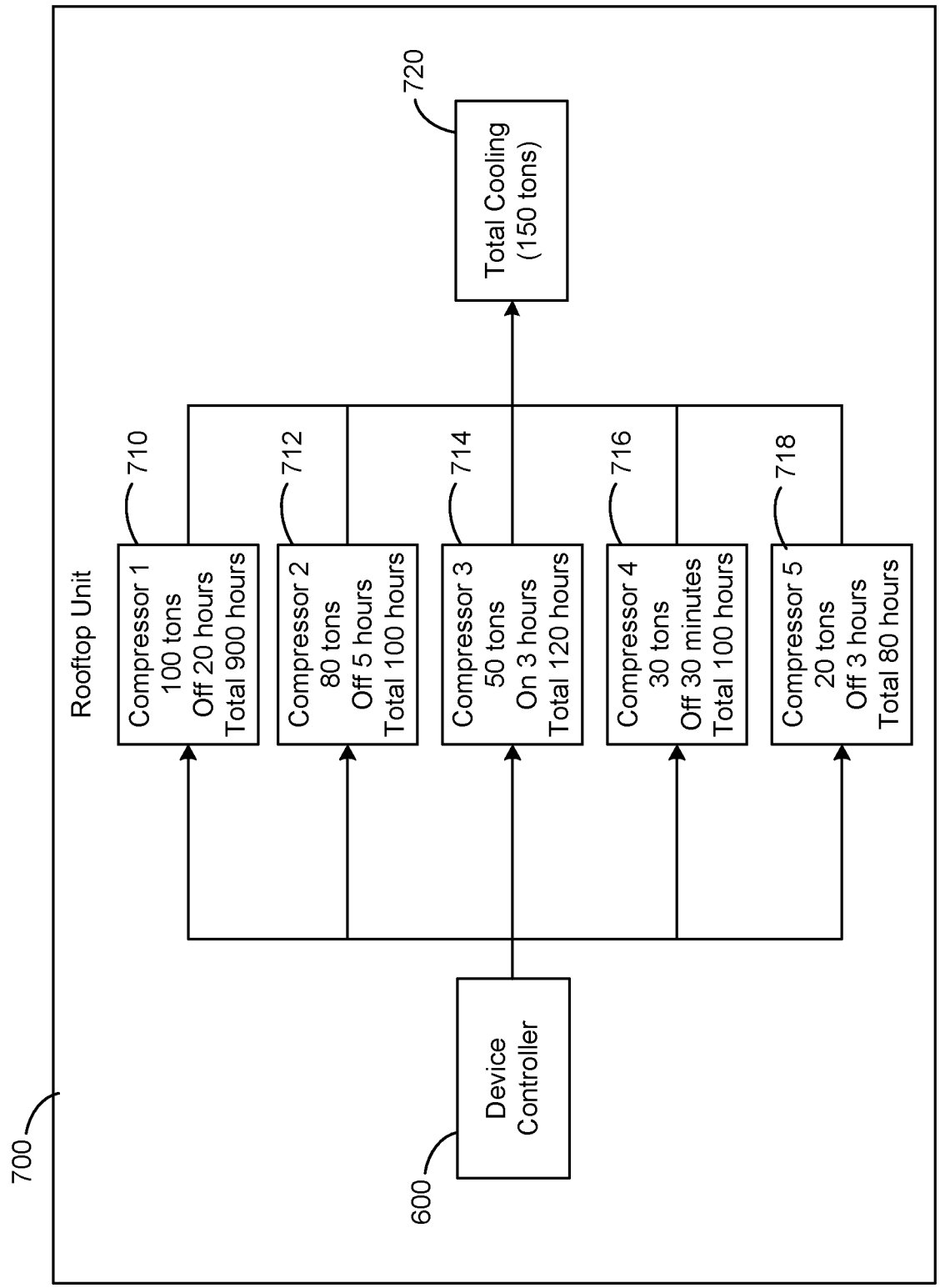
FIG. 7 is a block diagram of a rooftop unit containing a plurality of discrete devices, according to some embodiments.

Referring now to FIG. 7, a rooftop unit 700 with a device controller 600 is shown, according to an exemplary embodiment. Rooftop unit 700 is an example of a low level control system that can be configured to implement the device prioritization functionality previously described. Rooftop unit 700 is shown to include device controller 600 and a plurality of compressors (i.e., compressors 710, 712, 714, 716, and 718). Compressors 710-718 operate in parallel and can be selectively activated or deactivated by device controller 600 to achieve a target system capacity 720 (e.g., 150 tons). Each compressor 710-718 can be a discrete (on/off) device as mentioned above and is shown to include a device-specific capacity, a current operating state, and total runtime. In some embodiments, device information including device-specific capacities, current operating states, and total runtimes are communicated to device controller 600.

Figure 8:
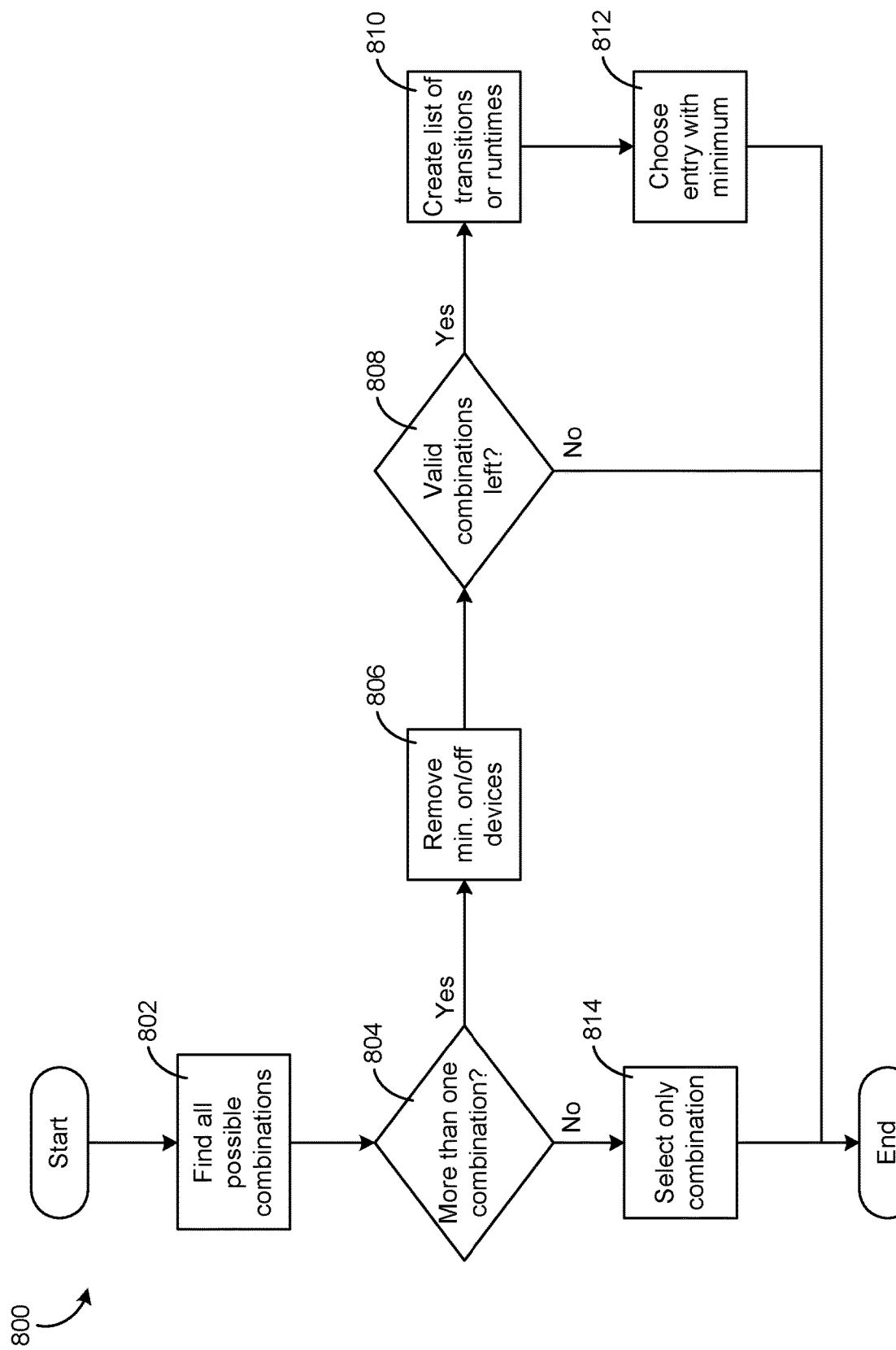
FIG. 8 is a flow diagram of a discrete device selection process, according to some embodiments.

Referring now to FIG. 8, a flow diagram of a process for selecting discrete devices is shown, according to an exemplary embodiments. Process 800 can be performed by various controllers in a building control system. For example, process 800 can be performed by a device controller 600 that controls a rooftop unit 700. Process 800 can be used to optimize control decisions regarding the selection of discrete devices in a multistage heating or cooling process of an HVAC system. The rooftop unit shown in FIG. 7 can be used as an example system to demonstrate how process 800 is performed.

Process 800 is shown to include finding all possible discrete device combinations to deliver a target system capacity (step 802). In some embodiments, step 802 is performed by combination finder 623 of device controller 600. Referring back to rooftop unit 700, device controller 600 can discover three combinations: compressors 710 and 714 (first combination), compressors 712, 714, and 718 (second combination), and compressors 710, 716, and 718 (third combination). Each of these three combinations can deliver a capacity of 150 tons of cooling and can thus be added to a list of possible combinations.

Process 800 is shown to include determining if more than one combination exists (step 804). In some embodiments, this step is performed by combination selector 625 of device controller 600. If only one possible combination exists to deliver a target capacity, then combination selector 625 can be configured to select that combination (step 814). However, in the case where only one possible combination is discovered, that combination may not be selected and the current combination of discrete devices may remain unchanged if one or more requirements (e.g., minimum transition time) are not met.

Process 800 is shown to include removing any combinations that contain a discrete device below a minimum transition time (step 806). In some embodiments, this step is performed by combination selector 625 of device controller 600. Continuing with the example rooftop unit system 700, assume that a minimum transition time is set at one hour. In this case, the third combination would be removed from the list of possible combinations since compressor 716 has only been off for 30 minutes, and the third combination requires compressor 716 to be turned from off to on. Neither of the first two combinations would be filtered out since each of compressors 710, 712, 714, and 718 have been in a current operating state for at least one hour. While step 806 is shown to apply a minimum transition time requirement, it should be noted that any number of requirements can be applied to a list of possible combinations at this step. Step 806 allows device controller 600 to extend the lifetime as well as improve the performance over time of each compressor within rooftop unit 700.

Process 800 is shown to include checking if valid combinations remain after a list of combinations has been filtered (step 808). In some embodiments, step 808 is performed by combination selector 625 of device controller 600. If only one combination exists after a list of possible combinations is filtered in step 806, then that combination can be selected. If no possible combinations exist after step 806, then the current combination of discrete devices may remain unchanged. If more than one combination still exists after step 806, then process 800 can continue to step 810.

Process 800 is shown to include creating a list of transition counts or runtimes associated with each combination (step 810). In some embodiments, step 810 is performed by combination selector 625 of device controller 600. Continuing with the example rooftop system 700, combination selector 625 can determine the first combination requires one transition while the second combination requires two transitions. In the case of the first combination, compressor 710 needs to go from off to on while compressor 714 is already on (one transition). In the case of the second combination, compressor 712 needs to go from off to on, compressor 714 is already on, and compressor 718 needs to go from off to on (two transitions). Combination selector 625 can also be configured to determine the total runtime of devices in the first combination is 1,020 hours (i.e., 900+120) while the total runtime for devices in the second combination is 300 hours (i.e., 100+120+80).

Process 800 is shown to include selecting the entry with the lowest total transition count or runtime (step 812). In some embodiments, step 812 is performed combination selector 625 of device controller 600. As an example, rooftop unit 700 can be configured to prioritize transition counts or runtimes when selecting discrete devices. In the case where transition counts are prioritized, combination selector 625 can select the first combination consisting of compressors 710 and 714. In the case where runtimes are prioritized, combination selector 625 would select the second combination consisting of compressors 712, 714, and 718.

Once a combination has been selected, signal generator 626 can be configured to generate control signals to send to one or more devices. For example, in the case where the combination of compressors 710 and 714 is selected, signal generator 625 can generate a control signal used to energize compressor 710. In some embodiments, the control signals are sent through communications interface 630 of device controller 600. It is important to note that process 800 can be performed by a variety of controllers in a building control system. Various heating, cooling, and ventilation processes involve a collection of discrete devices used to deliver a target capacity of heating or cooling.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for compressors of a building control system configured to operate the compressors in parallel to provide a desired capacity of heating or cooling for a building space, the controller comprising:
one or more circuits configured to:
identify the desired capacity of heating or cooling for the building space;
generate a list of combinations of the compressors that can be energized to provide the desired capacity of heating or cooling, each of the combinations comprising one or more of the compressors;
remove any of the combinations from the list of combinations that do not meet one or more requirements;
select one of the combinations from the list of combinations based on at least one of a runtime or a transition count associated with each of the combinations; and
generate one or more control signals in accordance with the selected combination and operate the compressors using the one or more control signals.

2. The controller of claim 1, wherein the one or more circuits of the controller are configured to operate the compressors by providing the one or more control signals to the compressors, the one or more control signals causing one or more of the compressors to transition between an off state and an on state in accordance with the selected combination.

3. The controller of claim 1, wherein the one or more circuits of the controller are further configured to receive a load setpoint from another controller in the building control system and identify the desired capacity of heating or cooling based on the load setpoint.

4. The controller of claim 1, wherein the one or more circuits of the controller are configured to send resource consumption data associated with the compressors to another controller in the building control system.

5. The controller of claim 1, wherein the controller is configured to receive device information from the compressors, the device information indicating at least one of a current state, an amount of time since a transition into the current state, or a cumulative runtime.

6. The controller of claim 1, wherein the runtime associated with each of the combinations indicates a total runtime of the compressors in the combination.

7. The controller of claim 6, wherein the one or more circuits of the controller are further configured to select a combination with a lowest total runtime.

8. The controller of claim 1, wherein the transition count associated with each of the combinations indicates a total number of on/off transitions for the compressors in each combination.

9. The controller of claim 8, wherein the one or more circuits of the controller are further configured to select the combination with a lowest transition count.

10. The controller of claim 1, wherein the one or more requirements comprise a minimum transition time for a compressor, the minimum transition time comprising a time period after the compressor transitions from a first state to a second state during which the compressor cannot transition back to the first state from the second state.

11. A method for controlling compressors of a building control system that operate in parallel to provide a desired capacity of heating or cooling for a building space, the method comprising:
    identifying, by a controller of the building control system, the desired capacity of heating or cooling for the building space;
    generating, by the controller, a list of combinations of the compressors that can be energized to provide the desired capacity of heating or cooling, each of the combinations comprising one or more of the compressors;
    removing, by the controller, any of the combinations from the list of combinations that do not meet one or more requirements;
    selecting, by the controller, a combination from the list of combinations based on a runtime associated with each of the combinations, wherein the runtime associated with each of the combinations indicates a total runtime of the compressors in the combination and the controller selects the combination with a lowest total runtime; and
    generating, by the controller, one or more control signals in accordance with the selected combination and operating the compressors using the one or more control signals.

12. The method of claim 11, further comprising operating, by the controller, the compressors by providing the one or more control signals to the compressors, the one or more control signals causing one or more of the compressors to transition between an off state and an on state in accordance with the selected combination.

13. The method of claim 11, further comprising:
    receiving, by the controller, a load setpoint from another controller in the building control system; and
    identifying, by the controller, the desired capacity of heating or cooling based on the load setpoint.

14. The method of claim 11, further comprising sending, by the controller, resource consumption data associated with the compressors to another controller in the building control system.

15. The method of claim 11, further comprising receiving, by the controller, device information from the compressors, the device information indicating at least one of a current state, an amount of time since a transition into the current state, or a cumulative runtime.

16. The method of claim 11, wherein the one or more requirements comprise a minimum transition time for a compressor, the minimum transition time comprising a time period after the compressor transitions from a first state to a second state during which the compressor cannot transition back to the first state from the second state.

17. A method for controlling compressors of a building control system that operate in parallel to provide a desired capacity of heating or cooling for a building space, the method comprising:
    identifying a desired capacity of heating or cooling for the building space;
    generating a list of combinations of the compressors that can be energized to provide the desired capacity of heating or cooling, each of the combinations comprising one or more of the compressors and meeting one or more requirements;
    selecting a combination from the list of combinations based on a transition count associated with each of the combinations, wherein the transition count associated with each of the combinations indicates a total number of state transitions required to achieve a desired state for each of the compressors in the combination, and wherein selecting the combination from the list of combinations comprises selecting the combination with a lowest transition count; and
    generating one or more control signals in accordance with the selected combination and operating the compressors using the one or more control signals.

18. The method of claim 17, further comprising receiving a load setpoint and identifying the desired capacity of heating or cooling for the building space based on the load setpoint.

19. The method of claim 17, further comprising maintaining historical data associated with the compressors in a memory of a controller in the building control system.

20. The method of claim 17, wherein the one or more requirements comprise a minimum transition time for a compressor, the minimum transition time comprising a time period after the compressor transitions from a first state to a second state during which the compressor cannot transition back to the first state from the second state.

* * * * *